US009687758B2

(12) United States Patent
Nakazawa et al.

(10) Patent No.: US 9,687,758 B2
(45) Date of Patent: Jun. 27, 2017

(54) FOAM REMOVING DEVICE AND FOAM REMOVING METHOD

(71) Applicants: Satoshi Nakazawa, Shizuoka (JP); Shuji Hanai, Shizuoka (JP)

(72) Inventors: Satoshi Nakazawa, Shizuoka (JP); Shuji Hanai, Shizuoka (JP)

(73) Assignee: RICOH COMPANY, LTD., Tokyo (JP)

( * ) Notice: Subject to any disclaimer, the term of this patent is extended or adjusted under 35 U.S.C. 154(b) by 351 days.

(21) Appl. No.: 13/949,509

(22) Filed: Jul. 24, 2013

(65) Prior Publication Data
US 2014/0026754 A1    Jan. 30, 2014

(30) Foreign Application Priority Data

Jul. 30, 2012 (JP) .................................. 2012-168369

(51) Int. Cl.
*B01D 19/00* (2006.01)
(52) U.S. Cl.
CPC ..... *B01D 19/0057* (2013.01); *B01D 19/0052* (2013.01)
(58) Field of Classification Search
CPC . B01D 19/0052; B01D 19/0057; B01D 19/00
USPC ..................... 95/242; 96/156, 177
See application file for complete search history.

(56) References Cited

U.S. PATENT DOCUMENTS

| 4,030,897 | A | * | 6/1977 | Pelzer | ................ | B01D 19/0052 |
| | | | | | | 494/13 |
| 4,324,557 | A | * | 4/1982 | Wegstedt | ................ | G01N 1/28 |
| | | | | | | 422/72 |
| 4,343,211 | A | * | 8/1982 | Volle | ................ | B26F 3/004 |
| | | | | | | 239/195 |

(Continued)

FOREIGN PATENT DOCUMENTS

| DE | 102005060851 | 7/2007 |
| EP | 0089128 A1 | 9/1983 |

(Continued)

OTHER PUBLICATIONS

European Search Report dated Feb. 4, 2014 in corresponding European patent application No. 13 17 7865.6.

*Primary Examiner* — T. Bennett McKenzie
(74) *Attorney, Agent, or Firm* — Cooper & Dunham LLP

(57) ABSTRACT

A foam removing device, containing: a liquid container; a foam-containing liquid supply pipe; an air bubble outlet pipe; a foam-removed liquid outlet pipe; an inner rotating cylinder; a liquid supply opening; and an air bubble outlet, wherein the inner rotating cylinder contains a foam-removed liquid guide hole formed therein, where the foam-removed liquid guide hole is configured to guide the foam-removed liquid reached to an area adjacent to a perimeter surface of the inner rotating cylinder by the centrifugal separation into a foam-removed liquid accommodating space between an outer surface of the inner rotating cylinder and an inner surface of the liquid container, and a foam-removed liquid (Continued)

outlet opening is provided in the foam-removed liquid accommodating space of the liquid container, where the foam-removed liquid outlet opening is configured to connect the foam-removed liquid outlet pipe with the liquid container.

14 Claims, 9 Drawing Sheets

(56) References Cited

U.S. PATENT DOCUMENTS

| | | | |
|---|---|---|---|
| 4,427,421 A * | 1/1984 | Jensen | B01D 19/0057 95/261 |
| 5,387,278 A | 2/1995 | Mangialardi | |
| 5,534,118 A * | 7/1996 | McCutchen | B01D 3/10 159/11.1 |

FOREIGN PATENT DOCUMENTS

| | | |
|---|---|---|
| JP | 58-036606 | 3/1983 |
| JP | 58-189006 | 11/1983 |
| JP | 63-158108 | 7/1988 |
| JP | 07-509179 | 10/1995 |
| JP | 2003-001011 | 1/2003 |
| JP | 2007-289814 | 11/2007 |

* cited by examiner

PRIOR ART

FOAM REMOVING DEVICE AND FOAM REMOVING METHOD

BACKGROUND OF THE INVENTION

Field of the Invention

The present invention relates to a foam removing device and a foam removing method, which remove foam by a centrifugal separation system, where centrifugal separation is performed on a foam-containing liquid containing air bubbles.

Description of the Related Art

As for a foam removing device for removing foam, conventionally known is a device in which a cylindrical liquid container for accommodating a foam-containing liquid containing air bubbles is rotated with a cylindrical axis thereof as a center, to act centrifugal separation on the foam-containing liquid (see Japanese Patent Application Laid-Open (JP-A) No. 2007-289814). In such a foam removing device, among the air bubbles and the liquid constituting the foam-containing liquid, the air bubbles formed of air having small specific gravity are concentrated in an area adjacent to the cylindrical axis as the liquid container is rotated and the centrifugal separation is acted on the foam-containing liquid. Meanwhile, the foam-removed liquid, from which the previously contained foam has been removed by concentrating the air bubbles in the area adjacent to the rotating axis, has larger specific gravity than air for forming the air bubbles, and therefore the foam-removed liquid moves in the direction far from the rotating axis, i.e., towards the cylindrical internal perimeter surface of the liquid container.

As a result, the cir bubbles concentrated in the center of the cylindrical axis, and the foam-removed liquid moved towards the internal perimeter surface of the liquid container are discharged outside through different outlet pipes, and therefore the foam-removed liquid, from which air bubbles have been removed, can be attained.

In the foam removing device disclosed in JP-A No. 2007-289814, a foam-containing liquid supply pipe, which is configured to supply a foam-containing liquid, is connected to one end of the liquid container relative to the cylindrical axis direction, and a foam-containing liquid supply opening is formed. Moreover, a foam-removed liquid outlet pipe, which is configured to guide the foam-removed liquid to outside of the liquid container, is connected to the other end of the liquid container relative to the cylindrical axis direction, and a foam-removed liquid outlet opening is formed. The foam-containing liquid supply pipe and the foam-removed liquid outlet pipe are liquid transport pipe each in the shape of a circular pipe, and are provided in the manner that a center of a cross-section thereof is aligned on the cylindrical axis of the liquid container.

Moreover, the air bubble outlet pipe for guiding the air bubbles outside the liquid container is provided in the foam-containing liquid supply pipe in the manner that it is go through a center of a cross-section of the foam-containing liquid supply pipe. The air bubble outlet pipe is a circular pipe member having an outer diameter sufficiently smaller than an inner diameter of the foam-containing liquid supply pipe, and has a structure where the foam-containing liquid is passed through the space between the internal perimeter surface of the foam-containing liquid is supply pipe and the outer perimeter surface of the air bubble outlet pipe to be supplied into the liquid container.

The foam-containing liquid supply pipe and the foam-removed liquid outlet pipe are not rotatable, and at the connection thereof with the rotatable liquid container, a pipe coupling having a shaft bearing function, so-called a rotary joint, which can rotatably connect with the liquid container, is provided. Meanwhile, the air bubble outlet pipe is provided inside the foam-containing liquid supply pipe, and has a structure that it extends to the position where the air bubbles are concentrated inside the liquid container. No connection is provided between the air bubble outlet pipe and the liquid container. Moreover, a separation plate, which is configured to prevent air bubbles from entering the foam-removed liquid outlet opening, is provided between the air bubble outlet opening, which is formed in the air bubble outlet pipe in the manner that it receives the air bubbles concentrated in the area adjacent to the cylindrical axis, and the foam-removed liquid outlet opening for sending the liquid in the liquid container into the foam-removed liquid outlet pipe. This separation plate is a disk member diameter of which is smaller than the inner diameter of the cylindrical liquid container. Then, the separation plate is a member for blocking a flow cannel of the air bubbles concentrated in the area adjacent to the cylindrical axis towards the foam-removed liquid outlet opening, and moving the liquid adjacent to the internal perimeter surface to the form-removed liquid outlet opening through a space between the outer perimeter edge thereof, and the internal perimeter surface of the liquid container.

In the foam-separation device disclosed in JP-A No. 2007-289814, the foam-containing liquid supplied into the liquid container through the foam-containing liquid supply pipe is rotated inside the liquid container. As a result of the action of the centrifugal separation due to the rotation, the air bubbles in the foam-containing liquid are concentrated to the area adjacent to the cylindrical axis, enter into the air bubble outlet pipe from the air bubble outlet opening, and then are discharged outside the liquid container.

Meanwhile, a liquid component of the foam-containing liquid moves, as a foam-removed liquid, in the direction far from the cylindrical axis, i.e., towards the internal perimeter surface of the liquid container, as the centrifugal separation acts due to the rotation. Thereafter, the foam-removed liquid is passed through a space between the internal perimeter surface of the liquid container and the separation plate, enters into the foam-removed liquid outlet pipe from the foam-removed liquid outlet opening, and then is discharged outside the liquid container.

In the manner as described, the air bubbles concentrated at a center of the cylindrical axis, and the foam-removed liquid moved towards the internal perimeter surface of the liquid container can be discharged outside the liquid container through different outlet pipes, and the foam-removed liquid, from which air bubbles have been removed, can be attained.

To maintain the performance of the foam removing device, inside of the liquid container is regularly washed. As for the washing, at least either the connection between the foam-containing liquid supply pipe and the liquid container, or the connection between the foam-removed liquid outlet pipe and the liquid container needs to be released. However, the pipe coupling having a shaft bearing function has a complicated structure compared to the pipe coupling having no shaft bearing function, and it takes time for releasing the connection, which increases the operational loads.

When the components are reconnected after releasing the connection, it is necessary to connect in the sealed state so as not to cause leakage of the liquid, and therefore it also takes time for reconnecting, which increases the operational loads.

Further, if the central axis of the connection at the side of the foam-containing liquid supply pipe functioning as the shaft bearing, and that of the connection at the side of the foam-removed liquid outlet pipe are not accurately matched, the rotating axis is sifted during the rotation of the liquid container, and therefore the sealing cannot be maintained, which may cause leakage of a liquid. Accordingly, it is necessary to c connect to accurately match the central axes of the two connections, which leads to a significant increase of the operational loads during the connection.

SUMMARY OF THE INVENTION

The present invention aims to provide a foam removing device, and a foam removing method, which has a structure that centrifugal separation is acted on a liquid in a liquid container, and reduces operational load when connecting the liquid container with a foam-containing liquid supply pipe and/or foam-removed liquid outlet pipe after releasing the connection between the liquid container with a foam-containing liquid supply pipe and/or foam-removed liquid outlet pipe.

The means for solving the aforementioned problems are as follows:

A foam removing device containing:

a liquid container accommodating a foam-containing liquid containing air bubbles;

a foam-containing liquid supply pipe configured to supply the foam-containing liquid to the liquid container;

an air bubble outlet pipe configured to guide air bubbles to outside of the liquid container, where the air bubbles are concentrated to an area adjacent to a rotating axis of the liquid container by centrifugal separation acted on the foam-containing liquid by rotation of the foam-containing liquid in the liquid container, and a foam-removed liquid outlet pipe configured to guide a foam-removed liquid to outside of the liquid container, where the foam-removed liquid is the foam-containing liquid from which air bubbles contained are removed as the foam-containing liquid is moved in a direction far from the rotating axis of the liquid container, and the air bubbles are concentrated to the area adjacent to the rotating axis by centrifugal separation, wherein the foam removing device contains an inner rotating cylinder, which is provided in the non-rotating liquid container, is cylindrical, and is rotated with a cylindrical axis thereof as a center, wherein the foam-containing liquid supply pipe is equipped with a liquid supply opening configured to supply the foam-containing liquid to an inner side of the inner rotating cylinder, wherein the air bubble outlet pipe is equipped with an air bubble outlet provided at a position on an inner side of the inner rotating cylinder adjacent to the cylindrical axis, where the air bubble outlet is configured to receive the air bubbles, wherein the inner rotating cylinder contains a foam-removed liquid guide hole formed therein, where the foam-removed liquid guide hole is configured to guide the foam-removed liquid reached to an area adjacent to a perimeter surface of the inner rotating cylinder by the centrifugal separation into a foam-removed liquid accommodating space between an outer surface of the inner rotating cylinder and an inner surface of the liquid container, and wherein a foam-removed liquid outlet opening is provided in the foam-removed liquid accommodating space of the liquid container, where the foam-removed liquid outlet opening is configured to connect the foam-removed liquid outlet pipe with the liquid container.

In the present invention, a foam-containing liquid supplied from the foam-containing liquid supply pipe is supplied into the inner rotating cylinder to which the liquid supply opening is provided, and turning force is applied to the foam-containing liquid by rotating the inner rotating cylinder. Then, as the foam-containing liquid is rotated, centrifugal separation is acted on the foam-containing liquid. Air bubbles in the foam-containing liquid are concentrated to an area adjacent to the cylindrical axis as centrifugal separation is acted on the foam-containing liquid, and enter into the air bubble outlet pipe from the air bubble outlet opening provided at a position adjacent to the cylindrical axis of the inner rotating cylinder, where air bubbles are concentrated, and then discharged outside the liquid container. Moreover, a liquid component in the foam-containing liquid is moved, as a foam-removed liquid, to the direction fat from the cylindrical axis, .e., towards the internal perimeter surface of the inner rotating cylinder, as centrifugal separation is acted due to the rotation. Thereafter, the foam-removed liquid is passed through the foam-removed liquid guide hole, and is then supplied into the foam-removed liquid accommodating space. As the foam-removed liquid outlet opening is provided in the foam-removed liquid accommodating space, the foam-removed liquid is passed through the foam-removed liquid accommodating space, enters into the foam-removed liquid outlet pipe from the foam-removed liquid outlet opening, and then is discharged outside the liquid container.

As described above, even using a structure where the liquid container is not rotatable, air bubbles contained in the foam-containing liquid and the foam-removed liquid can be discharged out of the liquid container through different outlet pipes by acting centrifugal separation on the foam-containing liquid due to rotation of the inner rotating cylinder, and the foam-removed liquid, from which air bubbles have been removed, can be attained.

Moreover, as a structure where the liquid container is not rotatable is used in the present invention, pipe couplings that do not have a shaft bearing function can be used at connections between the foam-containing liquid supply pipe and the liquid container and between the foam-removed liquid outlet pipe and the liquid container. The pipe coupling that does not have a shaft bearing function has a simpler structure than that of a pipe coupling having a shaft bearing function, and dismantling or connection thereof is easy. Therefore, the operational load at the time when the connection is dismantled and then connected again can be reduced.

Further, the liquid container is not rotatable, and therefore it is not necessary to provide two connections on the rotating axis of the rotating member, and it is not necessary to connect to accurately match the central axes of these two connections, which reduces the operational load at the time of the connection.

The present invention can provide an excellent effect that reduces operational load when connecting the liquid container with a foam-containing liquid supply pipe and/or foam-removed liquid outlet pipe after releasing the connection between the liquid container with a foam-containing liquid supply pipe and/or foam-removed liquid outlet pipe, with a structure that centrifugal separation is acted on a liquid in a liquid container.

DETAILED DESCRIPTION OF THE INVENTION

[Embodiment 1]

A first embodiment of a foam removing device to which the present invention has been applied (referred to as Embodiment 1, hereinafter) is explained hereinafter.

Figure 1:
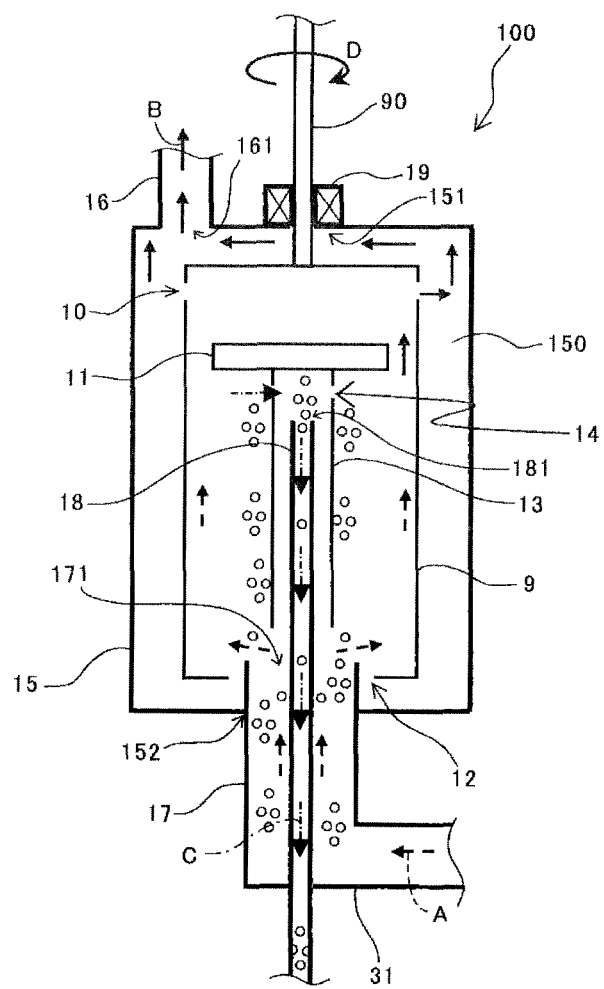
FIG. 1 is a schematic cross-sectional view schematically illustrating one example of a foam removing device according to Embodiment 1.

FIG. 1 is a schematic cross-sectional view schematically illustrating a foam removing device 100 according to Embodiment 1.

First, outline of the foam removing device 100 illustrated in FIG. 1 is explained. As illustrated in FIG. 1, the foam removing device 100 is equipped with an outer tube 15, an inner tube 9, a foam-separation circular pipe 13, a liquid inlet pipe 17, and a foam outlet pipe 18.

An arrow A depicted with a dashed line in FIG. 1 represents a flow of the foam-containing liquid containing air bubbles, an arrow B depicted with a solid line represents a flow of a foam-removed liquid from which air bubbles have been removed, and an arrow C depicted with a chain line represents a flow of air bubbles separated from the foam-removed liquid.

An inner tube rotating shaft 90 is connected to the top part of the inner tube 9, and the inner tube 9 is rotated by rotatably driving the inner tube rotating shaft 90 with a driving motor, which is not illustrated. A separation disk 11 is fixed onto the top part of the foam-separation circular pipe 13, and the foam-separation circular pipe 13 and the separation disk 11 are fixed to the inner tube 9 with a fixing member, which is not illustrated, and rotated in the direction depicted with the arrow D in FIG. 1 together with the inner tube 9, as the inner tube rotating shaft 90 is rotatably driven.

The outer tube 15, the liquid inlet pipe 17, and the foam outlet pipe 18 are members which are not rotated when the inner tube rotating shaft 90 is rotatably driven.

The outer tube 15 is substantially cylindrical with the axial direction of the cylindrical axis being a top-bottom direction thereof, and an outer tube shaft hole 151 configured to pass the inner tube rotating shaft 90 is provided at the top center part thereof. Moreover, a circular outer tube liquid-inlet opening 152 for inserting the liquid inlet pipe 17 in is the shape of a circular pipe is provided at the bottom center part of the outer tube 15.

To the outer tube shaft hole 151 of the outer tube 15, a shaft bearing sealing member 19 configured to seal the outer tube 15 with rotatably bearing the inner tube rotating shaft 90 is provided, so that the liquid inside the outer tube 15 is prevented from leaking out from the outer tube shaft hole 151. Moreover, to the outer tube liquid-inlet opening 152 of the outer tube 15, a sealing member (not illustrated) configured to seal between the outer tube 15 and the liquid inlet pipe 17 is provided, so that the liquid inside the outer tube 15 is prevented from leaking out from the outer tube liquid-inlet opening 152.

As illustrated in FIG. 1, moreover, a liquid outlet opening 161 connected to the liquid outlet pipe 16 configured to discharge the foam-removed liquid from which air bubbles have been removed by the foam removing device 100 is provided at the edge of the top surface of the outer tube 15.

Note that, as the outer tube 15 is a fixed member without being rotated, a position at which the liquid outlet opening 161 is not limited to the top surface of the outer tube 15, and the liquid outlet opening 161 can be provided to the side surface, i.e. a cylindrical peripheral surface, or the bottom surface thereof.

The inner tube 9 has a substantially cylindrical shape with the axial direction of the cylindrical axis being the top-down direction thereof, and is smaller than the outer tube 15, and has a size with which the inner tube 9 can be accommodated inside the outer tube 15. To the top surface of the inner tube 9, the aforementioned inner tube rotating shaft 90 is mounted, and a plurality of inner tube outlet openings 10 are provided at the positions on the side surface thereof slightly lower than the top surface.

The inner tube outlet opening 10 is an opening where the liquid (foam-removed liquid), which is to be moved to a foam-removed liquid accommodating space 150 formed between the inner tube 9 and the outer tube 15 from inside the inner tube during the rotation of the inner tube 9, passes through.

An inner tube liquid-inlet opening 12 configured to receive the liquid into the inner tube 9 is provided at the lower center part of the bottom surface of the inner tube 9. The inner tube liquid-inlet opening 12 is a circle a diameter of which is larger than that of a circumference of the liquid inlet pipe 17. In the driven state of the foam removing device 100, as illustrated in FIG. 1, the liquid inlet pipe 17 is inserted into the inner tube liquid-inlet opening 12 with forming a space with the rim of the inner tube liquid-inlet opening 12. As the liquid-inlet opening 171 provided at the top end of the liquid inlet pipe 17 inserted into the inner tube liquid-inlet opening 12 is positioned higher than the bottom surface of the inner tube 9 to which the inner tube liquid-inlet opening 12 is so provided, the foam-containing liquid containing air bubbles, which has passed through the liquid inlet pipe 17, is supplied into the inner tube 9. Moreover, the space between the rim of the inner tube liquid-inlet opening 12 and the periphery of the liquid inlet pipe 17 is an opening where the liquid (form-removed liquid), which is to be moved from the foam-removed liquid accommodating space 150 into inner tube 9, passes through.

The foam-separation circular pipe 13, which is rotated together with the inner tube 9, has an opening at the bottom end, and the top end thereof is blocked with the separation disk 11. In addition, a plurality of circular pipe foam-inlet openings 14 are provided at the positions on the side surface thereof slightly lower than the top end thereof. The circular pipe foam-inlet opening 14 is an opening where the liquid (the liquid containing a large amount of air bubbles), which is to be moved from inside the inner tube 9 to the foam-separation circular pipe 13 during the rotation of the inner tube 9, passes through. The separation disk 11 is a member, which prevents air bubbles from rising along the perimeter surface of the foam-separation circular pipe 13, and facilitates movements of the air bubbles to enter from the circular pipe foam-inlet opening 14 into foam-separation circular pipe 13. In the case where the separation disk 11 is not provided, the air bubbles, which have been concentrated to the area adjacent to the foam-separation circular pipe 13 by centrifugal separation, are raised, so that the air bubbles are discharged from the liquid outlet pipe 16 together with the liquid. By preventing the air bubbles to rise using the separation disk 11, the movements of air bubbles to enter from the circular pipe foam-inlet opening 14 into the foam-separation circular pipe 13 are facilitated. Moreover, the air bubbles, which have been entered into the foam-separation circular pipe 13, are also prevented from moving higher than the top end of the foam-separation circular pipe 13 by the separation disk 11.

Along the cylindrical axis of the outer tube 15 and the inner tube 9, a foam outlet pipe 18 configured to discharge air bubbles separated from the foam-removed liquid to the outside is provided. The bottom side of the foam outlet pipe 18 is fixed to the liquid inlet pipe 17 so that the foam outlet pipe 18 is aligned at the center of the cross-section of the liquid inlet pipe 17, and the foam outlet pipe 18 is extended out from the bottom surface of the liquid inlet pipe 17 of FIG. 1 and is connected to a foam collecting part, which is not illustrated. Similarly to the liquid inlet pipe 17, the foam outlet pipe 18 is inserted into the inner tube liquid-inlet opening 12. The foam outlet pipe 18 is extended to higher than the top end of the liquid inlet pipe 17, and inserted into the foam-separation circular pipe 13 from the opening provided at the bottom end of the foam-separation circular pipe 13. As illustrated in FIG. 1, the outer perimeter surface of the foam outlet pipe 18 inside the foam-separation circular pipe 13 forms a space with the internal perimeter surface of the so foam-separation circular pipe 13 to pass through the liquid. Moreover, the foam outlet pipe 18 is provided in the manner that a foam outlet opening 181 provided at the top end of the foam outlet pipe 18 is in the position slightly lower than the circular pipe foam-inlet opening 14.

To the liquid inlet pipe 17, a horizontal inlet pipe 31 is connected, and a liquid supply pump (not illustrated) is connected to the horizontal inlet pipe 31. By driving this liquid supply pump, a foam-containing liquid containing air bubbles is supplied into the foam removing device 100 through the horizontal inlet pipe 31 and the liquid inlet pipe 17, and the liquid or air bubbles inside the foam removing device 100 is pushed out by the supplied foam-containing liquid. As a result, the foam-removed liquid from which air bubbles have been separated is transported to a liquid compartment (not illustrated), which is externally provided, through the liquid outlet pipe 16, and the air bubbles (the liquid containing a large amount of foam) is transported to a foam compartment, which is externally provided, through the foam outlet pipe 18.

When the foam removing device 100 is used, the aforementioned driving motor (not illustrated) is driven to rotate the inner tube 9, and in this state, the liquid supply pump (not illustrated) is driven. By rotating the inner tube 9, the liquid inside the foam-removed liquid accommodating space 150 or the liquid inside the inner tube 9 is rotated in the same direction as the rotation of the inner tube 9, centrifugal separation acts on the liquid. As the foam-separation circular pipe 13 rotates together with the inner tube 9, moreover, the liquid inside the foam-separation circular pipe 13 is also rotated to perform centrifugal separation onto the liquid.

Next, a foam separation operation of the foam removing device 100 illustrated in FIG. 1 is explained.

By driving the liquid supply pump, a foam-containing liquid is supplied into the inner tube 9 from the liquid inlet pipe 17. To the liquid supplied into the inner tube 9, centrifugal separation is performed by the rotation of the inner tube 9. The liquid from which air bubbles have been removed is moved towards the internal perimeter surface of the inner tube 9, and the liquid containing a large amount of air bubbles and having small specific gravity is moved towards the cylindrical axis. The foam-removed liquid, which has reached the internal perimeter surface of the inner tube 9, moves along the internal perimeter surface. Once the foam-removed liquid reaches the position of the inner tube outlet opening 10 provided on the side surface of the inner tube 9, the foam-removed liquid passes through the inner tube outlet opening 10 from inside the inner tube 9, to move into the foam-removed liquid accommodating space 150.

Within the foam-removed liquid, which is discharged outside the inner tube 9 from the inner tube outlet opening 10, the liquid transported to the outside from the liquid outlet pipe 16 is collected in the liquid compartment as a liquid from which foam has been removed.

Within the foam-removed liquid, which is discharged outside the inner tube 9 from the inner tube outlet opening 10, the liquid fell downwards is returned into the inner tube 9 from the space of the inner tube liquid-inlet opening 12 with the liquid inlet pipe 17.

Meanwhile, air bubbles are concentrated to the area adjacent to the external perimeter surface of the foam-separation circular pipe 13 by the action of centrifugal separation. The collected air bubbles rise along the external perimeter surface of the foam-separation circular pipe 13, and are stopped with the bottom surface of the separation disk 11 to introduced into the foam-separation circular pipe 13 through the circular pipe foam-inlet opening 14. Then, the air bubbles entered into the foam-separation circular pipe 13 is concentrated to the area adjacent to the opening at the top end of the foam outlet pipe 18 by the action of centrifugal separation caused by rotating the liquid containing the air bubbles together with the rotation of the foam-separation circular pipe 13. Then, the air bubbles entered into the foam outlet pipe 18 from this opening pass through the foam outlet pipe 18 to be discharged into a foam compartment provided outside the foam removing device 100.

One example of a conventional foam removing device is explained here.

Figure 9:
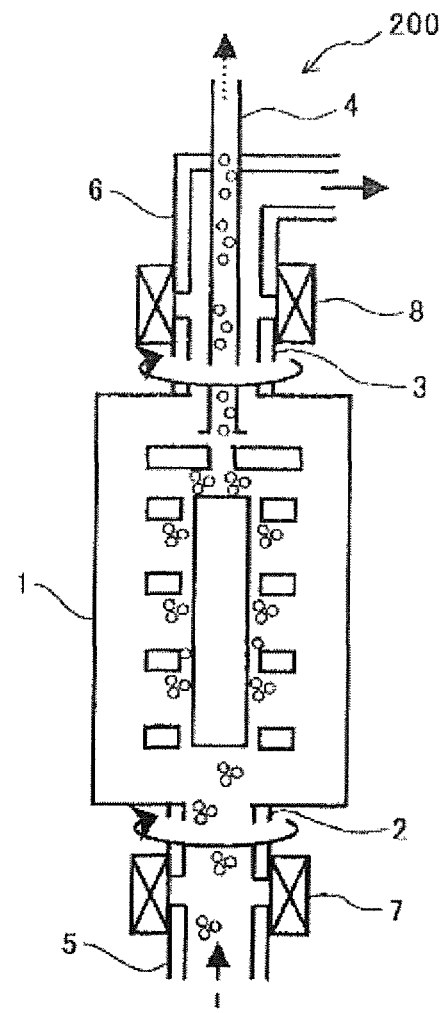
FIG. 9 is a schematic cross-sectional view schematically illustrating a conventional foam removing device.

FIG. 9 is a schematic cross-sectional view schematically illustrating a conventional foam removing device 200.

The conventional foam removing device 200 illustrated in FIG. 9 contains a cylindrical rotating container 1, and a rotating liquid inlet pipe 2 connected to one end of the cylindrical rotating container in the cylindrical axis (rotating axis) direction, where the rotating liquid inlet pipe 2 rotates together with the rotating container 1 and is configured to introduce a liquid. Moreover, at the other end of the cylindrical rotating container 1 relative to the cylindrical axis (rotating axis) direction, a rotating liquid-outlet pipe 3, which rotates together with the rotating container 1 and is configured to discharge the defoamed liquid outside, is connected. Further, an air bubble outlet pipe 4, which is configured to discharge a liquid containing a large amount of air bubbles outside, is provided to be concentric (to have the same rotating axis) with the rotating container 1.

To the rotating liquid inlet pipe 2, a fixed liquid inlet pipe 5, which is not rotatable, is connected via a sealing member 7 of the introduction side. Moreover, to the rotating liquid outlet pipe 3, a fixed liquid outlet pipe 6, which is not rotatable, is connected via a sealing member 8 of the discharge side. The sealing member 7 of the introduction side and the sealing member 8 of the discharge side each have a structure that the liquid does not leak even when the rotating liquid inlet pipe 2 or rotating so liquid outlet pipe 3 is rotated against the fixed liquid inlet pipe 5 or fixed liquid outlet pipe 6.

The conventional foam removing device 200 of such structure can perform defoaming of a liquid containing air bubbles by rotating the rotating container 1, the rotating liquid inlet pipe 2, and the rotating liquid outlet pipe 3, without causing leakage of the liquid.

When the inside of the rotating container 1 of the conventional foam removing device 200 is washed, however, either or both of the sealing member 7 of the introduction side and the sealing member 8 of the discharge side are taken out to perform washing, and therefore operations for washing become complicated.

Moreover, the operation for assembling a shaft bearing sealing member, such as the sealing member 7 of the introduction side and the sealing member 8 of the discharge side, after washing needs to be performed accurately to match the two axes of the sealing members of the top and the bottom, which makes the operations for washing more complicated. In the case where the axes are not accurately matched by this assembly, there is a problem that there is a high possibility for causing a trouble due to leakage of the FIG. 2 is an explanatory diagram illustrating a dismantled state when a container (outer tube 15) accommodating a liquid to which centrifugal separation is performed in the foam removing device 100 of Embodiment 1.

The foam removing device 100 of Embodiment 1 contains a rotating inner tube 9 configured to concentrate air bubbles to the area adjacent to a rotating axis thereof by centrifugal separation, and an outer tube 15, which is provided at the outer side of the inner tube 9 and is not rotatable. Moreover, a shaft bearing sealing member 19 is provided at an outer tube shaft hole 151 provided on the outer tube 15 to pass through the inner tube rotating shaft 90 for rotating the inner tube, where the shaft bearing sealing member 19 is configured to rotatably bear the inner tube rotating shaft 90, and to conceal (seal) the space between the outer tube shaft hole 151 and the inner tube rotating shaft 90.

In the foam removing device 100 of Embodiment 1, it is sufficient to use only one sealing member for a shaft, which is configured to rotatably hear a rotating member, and seal the space between a fixed member, which is not rotatable, and the rotating member. Therefore, after dismantling to wash the inner side of the outer tube 15, it is not necessary to perform complicated operations, such as matching one axial sealing member with another axial sealing member, Moreover, as it is not necessary to perform matching of axes, a trouble of leakage of a liquid, which may be caused when axes are not accurately matched, can be avoided.

Figure 2:
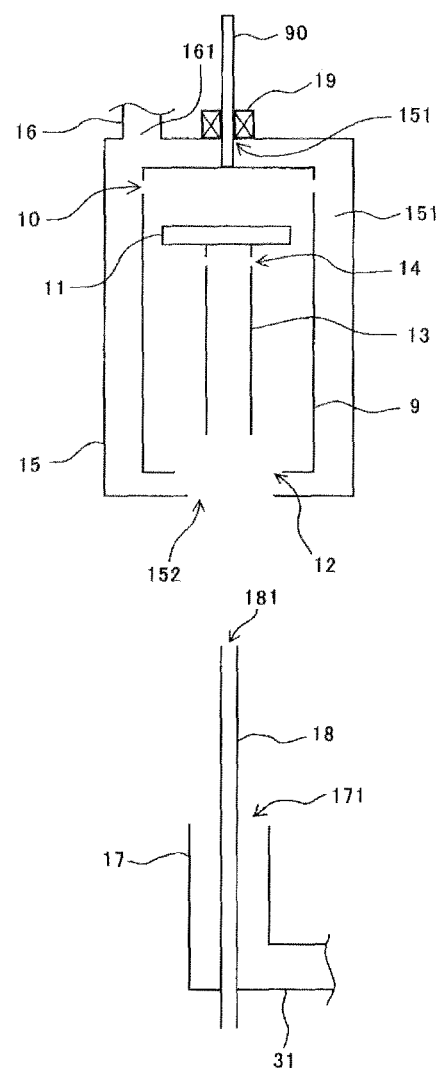
FIG. 2 is an explanatory diagram illustrating a dismantled state of the foam removing device according to Embodiment 1.

Further, when the inner area of the outer tube 15 is washed in the foaming removing device 100 of Embodiment 1, as illustrated in FIG. 2, the members rotating together with inner tube 9 (foam-separation circular pipe 13 and separation disk 11) and the outer tube 15 are left to the side of the shaft bearing sealing member 19, and other members (liquid inlet pipe 17 and foam outlet pipe 18) can be pulled out downwards relative to the outer tube 15. Specifically, the outer tube liquid-inlet opening 152 is formed in the bottom surface of the outer tube 15, and a sealing member (not illustrated) configured to seal the space between the rim of this opening and the liquid inlet pipe 17 is provided. This sealing member is a member for sealing the space between fixed members, i.e., the outer tube 15 and the liquid inlet pipe 17, which are not rotatable, and therefore a structure, which is simple, compared to the sealing member of the shaft, and can be dismantled, can be realized. Since the part for sealing the space between the fixed members with the sealing member can be dismantled without dismantling a part for sealing with a sealing member of the shaft at the time of washing, complication of dismantling at the time of washing can be reduced.

[Embodiment 2]

A second embodiment of a foam removing device, to which the present invention has been applied, (referred to as Embodiment 2, hereinafter) is explained next.

Figure 3:
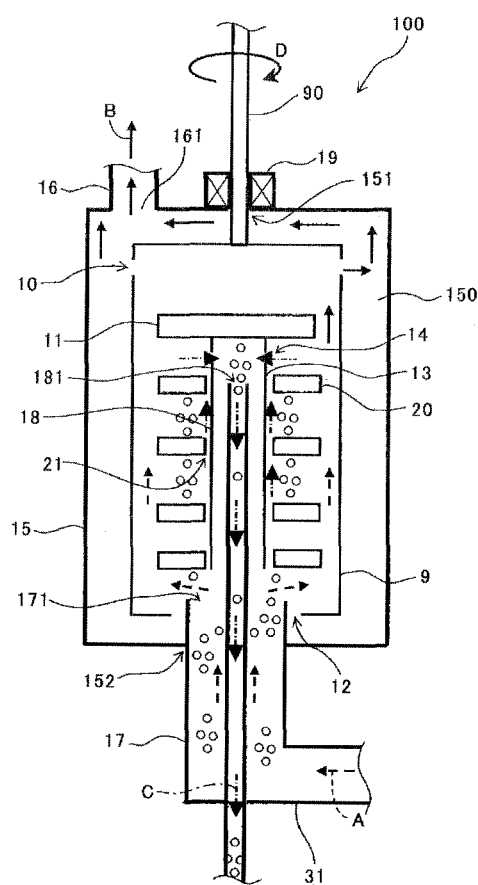
FIG. 3 is a schematic cross-sectional view schematically illustrating one example of a foam removing device according to Embodiment 2.

FIG. 3 is a schematic cross-sectional view schematically to illustrating a foam removing device 100 according to Embodiment 2.

The foam removing device 100 of Embodiment 2 is different from the foam removing device 100 of Embodiment 1 in that the foam removing device 100 of Embodiment 2 contains a toric doughnut-shaped plate 20 provided so that the foam-separation circular pipe 13 is passed through a center hole thereof. As other structures thereof are the same as of Embodiment 1, only difference is explained.

As illustrated in FIG. 3, the foam removing device 100 of Embodiment 2 contains a plurality of doughnut-shaped plates 20 provided along the up-down direction, and the external diameter of each doughnut-shaped plate 20 is smaller than the internal diameter of the rotating inner tube 9. Each doughnut-shaped plate 20 is partially connected to the foam-separation circular pipe 13 to form a gap 21 with the outer perimeter surface of the foam-separation circular pipe 13. Here, "partially connected" is a connecting state, which is different from "entirely connected," where the entire rim of the centric hole of the doughnut-shaped plate 20 is connected with the outer perimeter surface of the foam-separation circular pipe 13. Specifically, it is a connecting state where a rod-shaped connecting member (not illustrated) connects the rim of the centric hole of the doughnut-shaped plate 20 with the outer perimeter surface of the foam-separation circular pipe 13 with a few connecting positions (e.g., four positions per 90°).

In Embodiment 2, the air bubbles reach inside the centric hole of the doughnut-shaped plate 20 within the air bubbles move towards the rotation center by centrifugal separation pass through the gap 21, and move upwards where the circular pipe foam-inlet opening 14 is formed along the outer perimeter surface of the foam-separation circular pipe 13.

Meanwhile, the movements of the up-down directions of the air bubbles positioned outside the centric hole of the doughnut-shaped plate 20, within the air bubbles move towards the rotation center by centrifugal separation is prevented by the doughnut-shaped plate 20, and the air bubbles are collected and held by the bottom surface of the doughnut-shaped plate 20. Then, when the air bubbles move towards the rotation center and reach inside the centric hole of the doughnut-shaped plate 20 by further action of centrifugal separation, the air bubbles can pass through the gap 21 and move upwards along the form-separation circular pipe 13. The air bubbles passed through the gap 21 and moved upwards along the foam-separation circular pipe 13 are passed through the circular pipe foam-inlet opening 14 to enter the foam outlet pipe 18 from the foam outlet opening 181, and are then discharged outside the device through the foam outlet pipe 18.

By mounting the aforementioned doughnut-shaped plate 20, within the air bubbles move towards the rotation center by centrifugal separation, the air bubbles, which do not reach the area adjacent to the outer perimeter surface of the foam-separation circular pipe 13, can be prevented from moving in the up-down directions.

If the air bubbles, which do not reach the area adjacent to the outer perimeter surface of the foam-separation circular pipe 13, can move in the up-down directions, the air bubbles, which are reached the height of the circular pipe foam-inlet opening 14, may be moved in the circumferential direction along the flow of the liquid, without entering the circular pipe foam-inlet opening 14. If the air bubbles are moved in the circumferential direction along the flow of the liquid, there is a possibility that the air bubbles may be mixed back into the foam-removed liquid, from which air bubbles have been removed. In contrast, the foam removing device 100 of Embodiment 2 can prevent the air bubbles, which do not reach the area adjacent to the outer perimeter surface of the foam-separation circular pipe 13, from moving in the up-down directions using the doughnut-shaped plate 20. Accordingly, the air bubbles, which reach up to the height of the circular pipe foam-inlet opening 14, can be prevented from moving in the circumferential direction along with the flow of the liquid without entering the circular pipe foam-inlet opening 14, and prevented from mixing back into the foam-removed liquid, from which air bubbles have been removed. As a result, sharpness of separation of the air bubbles can be improved.

[Embodiment 3]

Next, a third embodiment of a foam removing device, to which the present invention is applied, (referred to as Embodiment 3 hereinafter) is explained.

Figure 4:
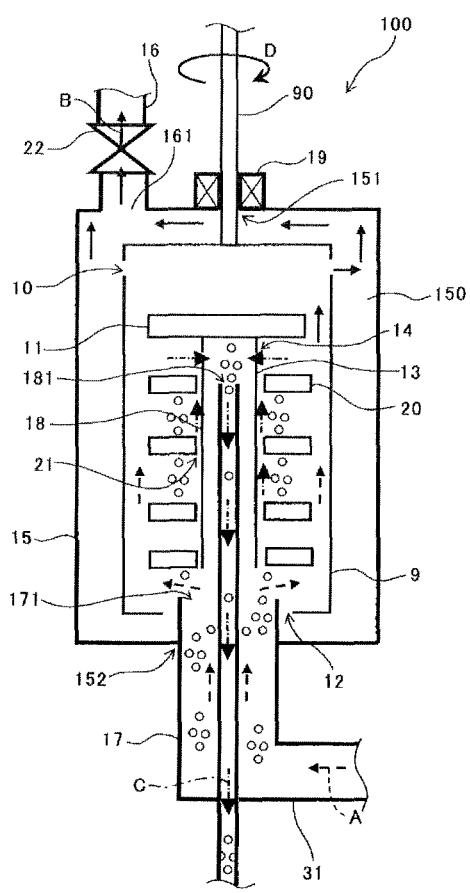
FIG. 4 is a schematic cross-sectional view schematically illustrating one example of a foam removing device according to Embodiment 3.

FIG. 4 is a schematic cross-sectional view schematically illustrating the foam removing device 100 according to Embodiment 3.

The foam removing device 100 of Embodiment 3 is different from the foam removing device 100 of Embodiment 2 in that the liquid outlet pipe 16 of the foam removing device 100 of Embodiment 3 is equipped with a valve 22. As other structures thereof are the same as of Embodiment 2, only difference is explained.

As illustrated in FIG. 4, the foam removing device 100 of Embodiment 3 is equipped with a valve 22 at a liquid outlet pipe 16, and has a structure where a flow rate of the discharged liquid from the liquid outlet pipe 16 can be controlled. In the case where an amount of air bubbles of the foam-containing liquid flown into the outer tube 15 is large, the valve 22 is turned tighter, and in the case where an amount of air bubbles of the foam-containing liquid is small, the valve 22 is opened. As a result, an amount of air bubbles in the liquid containing a large amount of air bubbles, which is discharged from the foam outlet pipe 18, can be controlled to the desirable amount. Use of such valve 22 enables to set the defoaming performance depending on the stated of the air bubbles contained, or a viscosity of the liquid.

[Embodiment 4]

Next, a fourth embodiment of a foam removing device, to which the present invention has been applied, (referred to as Embodiment 4, hereinafter) is explained.

Figure 5A:
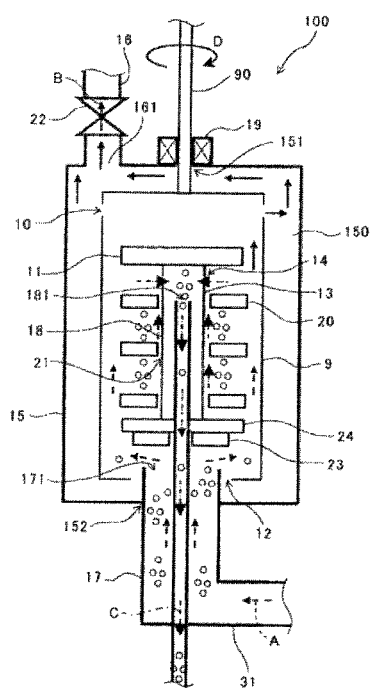
FIG. 5A is a schematic cross-sectional view schematically illustrating one example of a foam removing device according to Embodiment 4.
Figure 5B:
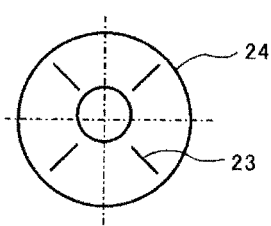
FIG. 5B is a bottom view of accelerating plate in one example of the foam removing device according to Embodiment 4.

FIGS. 5A and 5B are explanatory diagrams schematically illustrating the foam removing device 100 according to Embodiment 4, and FIG. 5A is a schematic cross-sectional view and FIG. 5B is a bottom view of an accelerating plate 24.

The foam removing device 100 of Embodiment 4 is different from the foam removing device 100 of Embodiment 3 in that the foam removing device 100 of Embodiment 4 is equipped with the accelerating plate 24. As other structures thereof are the same as of Embodiment 3, only difference is explained.

As illustrated in FIG. 5, the foam removing device 100 of Embodiment 4 contains an accelerating plate 24 on the bottom of the foam-separation circular pipe 13, which is the closest to the liquid inlet pipe 17, where the accelerating plate 24 has a radial protrusion 23 on the surface thereof facing the liquid inlet opening 171 of the liquid inlet pipe 17. Because of the radial protrusion 23, the time required for the foam-containing liquid sent from the liquid inlet pipe 17 into the inner tube 9 to achieve the rotational speed of the inner tube 9 is shortened. As a result, the duration for acting the centrifugal separation on the foam-containing liquid can be prolonged, and an efficiency for separating air bubbles from the foam-containing liquid can be improved.

Figure 6A:
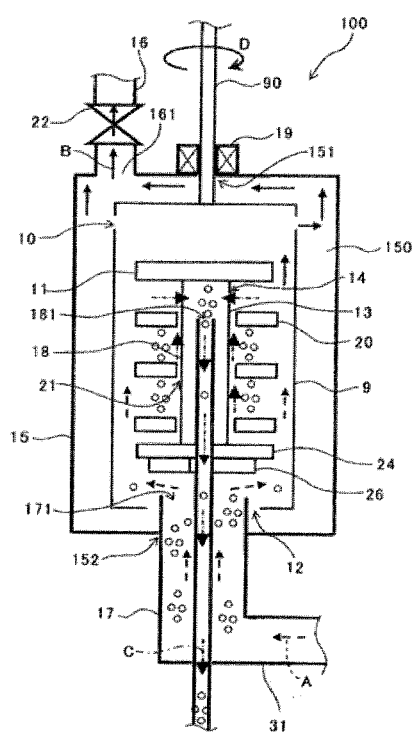
FIG. 6A is a schematic cross-sectional view illustrating one example of a foam removing device equipped with spiral protrusion instead of radial protrusion.
Figure 6B:
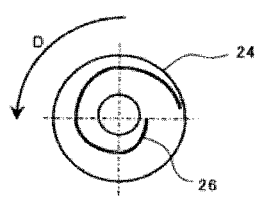
FIG. 6B is a bottom view of an accelerating plate in the foam removing device equipped with spiral protrusion instead of radial protrusion.
Figure 7A:
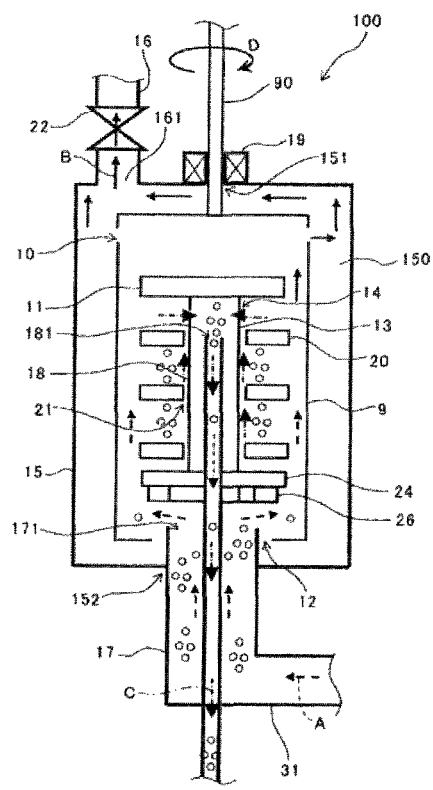
FIG. 7A is a schematic cross-sectional view illustrating one example of a foam removing device equipped with multiple flight spiral protrusion instead of radial protrusion.
Figure 7B:
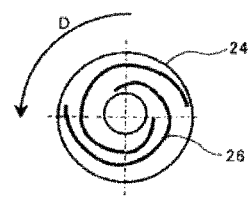
FIG. 7B is a bottom view of an accelerating plate of the foam removing device equipped with multiple flight spiral protrusion instead of radial protrusion.

The protrusion provided at the bottom surface of the accelerating plate 24 is not limited to the radial protrusion 23, which is radially provided as illustrated in FIG. 5. FIGS. 6A and 6B are explanatory diagrams of a foam removing device 100 equipped with a spiral protrusion 26 instead of the radial protrusion 23, and FIG. 6A is a schematic cross-sectional view and FIG. 6B is a bottom view of the accelerating plate 24. Moreover, FIGS. 7A and 7B are explanatory diagrams of a foam removing device 100 equipped with multiple flight spiral protrusion 26, and FIG. 7A is a schematic cross-sectional view and FIG. 7B is a bottom view of the accelerating plate 24.

The structure using the accelerating plate 24 equipped with the spiral protrusion 26 as illustrated in FIGS. 6 and 7 can further improve an efficiency of separating air bubbles from a foam-containing liquid, compared to the case of the accelerating plate 24 equipped with the radial protrusion 23.

[Embodiment 5]

Next, a fifth embodiment of a foam removing device, to which the present invention has been applied, (referred to as Embodiment 5, hereinafter) is explained.

Figure 8A:
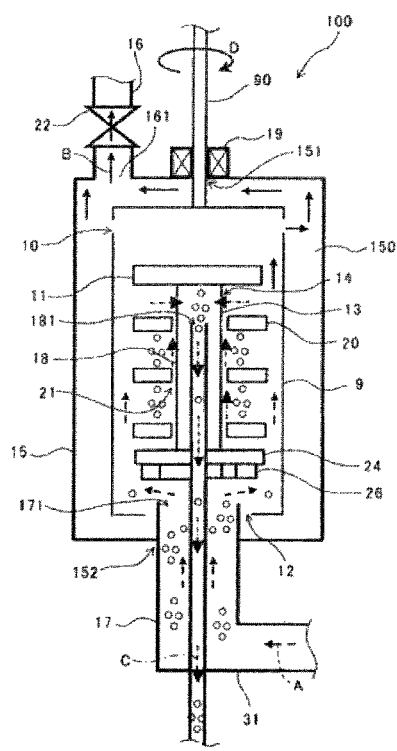
FIG. 8A is a schematic cross-sectional view schematically illustrating one example of a foam removing device according to Embodiment 5.
Figure 8B:
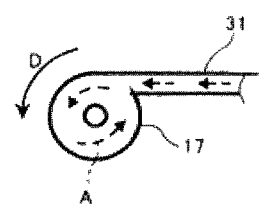
FIG. 8B is a horizontal sectional view of the foam removing device according to Embodiment 5, at the position where a horizontal inlet pipe of a liquid inlet pipe is provided.

FIGS. 8A and 8B are explanatory diagram schematically illustrating the foam removing device 100 according to Embodiment 5, and FIG. 8A is a schematic cross-sectional view and FIG. 8B is a horizontal cross-sectional view at the position where a horizontal inlet pipe 31 of a liquid inlet pipe 17 is provided.

The foam removing device 100 of Embodiment 5 is different from the foam removing device 100 of Embodiment 4 in that the position at which the horizontal inlet pipe 31 is provided is the tangential direction relative to a circular cross-section of the liquid inlet pipe 17.

As other structures thereof are the same as of Embodiment 4, only difference is explained.

In the foam removing device 100 of Embodiment 5, as illustrated in FIG. 8, the horizontal inlet pipe 31, which is configured to supply the foam-containing liquid, is provided to the outer tube 15, which is not rotatable, from the tangent direction of the circular cross-section thereof.

Moreover, rotational force in the rotational direction (the direction depicted with the arrow D in FIG. 8) of the inner tube 9 is applied to the foam-containing liquid, which is supplied from the horizontal inlet pipe 31, in the liquid inlet pipe 17. As a result, the time required for the foam-containing liquid supplied into the inner tube 9 to achieve the rotational speed of the inner tube 9 is shortened, the duration for acting the centrifugal separation on the foam-containing liquid can be prolonged, and an efficiency for separating air bubbles from the foam-containing liquid can be improved.

EXAMPLES

Examples for removing air bubbles from foam-containing liquid using a foam removing device 100 based on the conditions of each so Example or Comparative Example will be explained hereinafter.

Example 1

With the foam removing device 100 of Embodiment 1 illustrated in FIG. 1, a foam-containing liquid, which contains air bubbles and the density of which had been reduced to 0.70 [g/cm$^3$] was treated under the conditions of the following (1) to (3). As a result, the density of the foam-removed liquid discharged from the liquid outlet pipe 16 was increased up to 0.86 [g/cm$^3$]. Moreover, as a result of a running test performed for two consecutive days, no trouble associated with leakage of the liquid occurred. Further, at the time when the inner tube 9 was washed, the time required for dismantling of the foam removing device 100, washing, and assembling thereof was 15 minutes.
(1) Liquid: 10% by mass polyvinyl alcohol (PVA) aqueous solution (the liquid density thereof in the state where no foam was included was 1.02 [g/cm$^3$])
(2) Rotating speed of the inner tube 9:500 [rpm]
(3) Liquid feeding rate: 100 [L/min]

Example 2

With the foam removing device 100 of Embodiment 2 illustrated in FIG. 3, a foam-containing liquid was treated under the same conditions as in Example 1. As a result, the density of the foam-removed liquid discharged from the liquid outlet pipe 16 was increased up to 0.90 [g/cm$^3$]. Moreover, as a result of a running test performed for two consecutive days, no trouble associated with leakage of the liquid occurred. Further, at the time when the inner tube 9 was washed, the time required for dismantling of the foam removing device 100, washing, and assembling thereof was 20 minutes.

Example 3

With the foam removing device 100 of Embodiment 4 illustrated in FIG. 5, a foam-containing liquid was treated under the same conditions as in Example 1. As a result, the density of the foam-removed liquid discharged from the liquid outlet pipe 16 was increased up to 0.92 [g/cm$^3$]. Moreover, as a result of a running test performed for two consecutive days, no trouble associated with leakage of the liquid occurred. Further, at the time when the inner tube 9 was washed, the time required for dismantling of the foam removing device 100, washing, and assembling thereof was 20 minutes.

Example 4

With the foam removing device 100 using the accelerating plate 24 equipped with the spiral protrusion 26 illustrated in FIG. 6, a foam-containing liquid was treated under the same conditions as in Example 1. As a result, the density of the foam-removed liquid discharged from the liquid outlet pipe 16 was increased up to 0.95 [g/cm$^3$]. Moreover, as a result of a running test performed for two consecutive days, no trouble associated with leakage of the liquid occurred. Further, at the time when the inner tube 9 was washed, the time required for dismantling of the foam removing device 100, washing, and assembling thereof was 20 minutes.

Example 5

With the foam removing device 100 using the accelerating plate 24 equipped with the multiple flight spiral protrusion 26 illustrated in FIG. 7, a foam-containing liquid was treated under the same conditions as in Example 1. As a result, the density of the foam-removed liquid discharged from the liquid outlet pipe 16 was increased up to 0.97 [g/cm$^3$]. Moreover, as a result of a running test performed for two consecutive days, no trouble associated with leakage of the liquid occurred. Further, at the time when the inner tube 9 was washed, the time required for dismantling of the foam removing device 100, washing, and assembling thereof was 20 minutes.

Example 6

With the foam removing device 100 of Embodiment 5 illustrated in FIG. 8, a foam-containing liquid was treated under the same conditions as in Example 1. As a result, the density of the foam-removed liquid discharged from the liquid outlet pipe 16 was increased up to 1.00 [g/cm$^3$]. Moreover, as a result of a running test performed for two consecutive days, no trouble associated with leakage of the liquid occurred. Further, at the time when the inner tube 9 was washed, the time required for dismantling of the foam removing device 100, washing, and assembling thereof was 20 minutes.

Comparative Example 1

With the conventional foam removing device 200 illustrated in FIG. 9, a foam-containing liquid was treated under the same conditions as in Example 1. As a result, the density of the foam-removed liquid discharged from the liquid outlet pipe 16 was increased up to 0.80 [g/cm$^3$]. Moreover, as a result of a running test performed for two consecutive days, slight leakage of the liquid was occurred from the sealing member 8 of the discharged side provided at the top of the rotating container 1. Further, at the time when the inner tube 9 was washed, the time required for dismantling of the conventional foam removing device 200, washing, and assembling thereof was 90 minutes, which was 6 times longer than the time required in Example 1.

To the foam removing device 100 of the present invention, a liquid feeding system can be easily mounted, and the foam removing device 100 of the present invention can surely remove foam without restricted by a flow rate or properties of a liquid. Moreover, as a structure for collecting air bubbles to an area adjacent to the rotating axis by centrifugal separation, the foam removing device 100 of the present invention contains the rotatable inner tube 9, and the outer tube 15, which is provided at the outer side of the inner tube 9 and is not rotatable. Further, the shaft bearing sealing member 19, which is configured to seal the inner tube rotating shaft 90 configured to transmit turning force and drive to rotate the inner tube 9, is provided on the outer tube 15. As a result of the structure as mentioned above, it is sufficient to use only one a shaft bearing sealing member to seal the rotating member. Therefore, it is not necessary to perform complicated operation to match another shaft bearing sealing member with the rotational axis after washing. Since it is not necessary to perform operation for matching the rotating axis, a trouble associated with leakage of the liquid, which would be cased when central axis of two shaft bearing sealing members cannot be accurately matched, can be avoided.

As explained above using FIG. 2, moreover, the foam-removing device 100 of each of the aforementioned embodiments has a structure where the outer tube 15 and the inner tube 9 are left to the side of the shaft bearing sealing member 19, and other members can be pulled out downwards relative to the outer tube 15. As a result of this structure, inner areas of the outer tube 15 and the inner tube 9 can be washed without taking the shaft bearing sealing member 19 off, and therefore it is possible to reduce complexities caused during washing.

The foam removing device 100 of each of the aforementioned embodiments has a structure where the outer tube shaft hole 151 is provided in the outer tube 15, the inner tube rotating shaft 90 is passed through the outer tube shaft hole 151, and turning force is externally applied to the inner tube 9 via the inner tube rotating shaft 90. A structure for transmitting turning force to the inner tube 9 is not limited to the structure having a member connecting between a driving source and the inner tube, which passes through, such as the inner tube rotating shaft 90. Any structure can be applicable, as long as it is a structure by which turning force can be applied to the inner tube 9 provided inside the outer tube 15 serving as a liquid container, for example, a structure where the inner tube 9 provided inside the outer tube 15 is rotated using magnetic force.

Those explained above are merely examples, and the present invention exhibits a distinct effect depending on each of the following embodiments.
(Embodiment A)

A foam removing device (e.g., a foam removing device 100) contains:

a liquid container (e.g., an outer tube 15) accommodating a foam-containing liquid containing air bubbles;

a foam-containing liquid supply pipe (e.g., a liquid inlet pipe 17) configured to supply the foam-containing liquid to the liquid container;

an air bubble outlet pipe (e.g., a foam outlet pipe 18) configured to guide air bubbles to outside of the liquid container, where the air bubbles are concentrated to an area adjacent to a rotating axis of the liquid container by centrifugal separation acted on the foam-containing liquid by rotation of the foam-containing liquid in the liquid container; and a foam-removed liquid outlet pipe (e.g., liquid outlet pipe 16) configured to guide a foam-removed liquid to outside of the liquid container, where the foam-removed liquid is the foam-containing liquid from which air bubbles contained are removed as the foam-containing liquid is moved in a direction far from the rotating axis of the liquid container, and the air bubbles are concentrated to the area adjacent to the rotating axis by centrifugal separation, in which the foam removing device contains an inner rotating cylinder (e.g., an inner tube 9), which is provided in the non-rotating liquid container, is cylindrical, and is rotated with a cylindrical axis thereof as a center, in which the foam-containing liquid supply pipe is equipped with a liquid supply opening (e.g., a liquid inlet opening 171) configured to supply the foam-containing liquid to an inner side of the inner rotating cylinder, in which the air bubble outlet pipe is equipped with an air bubble outlet (e.g., a foam outlet opening 181) provided at a position on an inner side of the inner rotating cylinder adjacent to the cylindrical axis, where the air bubble outlet is configured to receive the air bubbles, in which the inner rotating cylinder contains a foam-removed liquid guide hole (e.g., an inner tube outlet opening 10) formed therein, where the foam-removed liquid guide hole is configured to guide the foam-removed liquid reached to an area adjacent to a perimeter surface of the inner rotating cylinder by the centrifugal separation into a foam-removed liquid accommodating space (e.g., a foam-removed liquid accommodating space 150) between an outer surface of the inner rotating cylinder and an inner surface of the liquid container, and in which a foam-removed liquid outlet opening (e.g., a liquid outlet opening 161) is provided in the foam-removed liquid accommodating space of the liquid container, where the foam-removed liquid outlet opening is configured to connect the foam-removed liquid outlet pipe with the liquid container.

According to this embodiment, as explained in the aforementioned embodiments, a structure where the liquid container is not rotatable is used, and therefore pipe couplings that do not have a shaft bearing function can be used at connections between the foam-containing liquid supply pipe and the liquid container and between the foam-removed liquid outlet pipe and the liquid container. The pipe coupling that does not have a shaft bearing function has a simpler structure than that of a pipe coupling having a shaft bearing function, and dismantling or connection thereof is easy. Therefore, the operational load at the time when the connection is dismantled and then connected again can be reduced.

Further, the liquid container is not rotatable, and therefore it is not necessary to provide two connections on the rotating axis of the rotating member, and it is not necessary to connect to accurately match the central axes of these two connections, which reduces the operational load at the time of the connection. Accordingly, with the structure where centrifugal separation is acted on the liquid in the liquid container, the operation load for releasing the connection between the liquid container and either the foam-containing liquid supply pipe or the foam-removed liquid outlet pipe, followed by reconnecting can be reduced.
(Embodiment B)

In (Embodiment A), a shaft hole (e.g., an outer tube shaft hole 151) is formed at one end of the liquid container relative to an axial direction of the cylindrical axis, where shaft hole is configured to insert therein a rotating shaft member (e.g., an inner tube rotating shaft 90) for transmitting turning force to the inner rotating cylinder, and in which a shaft bearing sealing member (e.g., a shaft bearing sealing member 19), which is configured to rotatably bear the rotating shaft member relative to the liquid container, and to seal between a rim of the shaft hole and the rotating shaft member, is provided.

According to this embodiment, as explained in the aforementioned embodiments, a structure for transmitting turning force and rotatably driving the inner rotating cylinder provided in the non-rotatable liquid container can be realized.
(Embodiment C)

In (Embodiment A) or (Embodiment B), a separation assisting circular pipe (e.g., a foam-separation circular pipe 13) is provided inside the inner rotating cylinder to cover the air bubbles outlet pipe, where the separation assisting circular pipe rotates together with the inner rotating cylinder, and a center of a circular cross-section of the separation assisting circular pipe is aligned on the cylindrical axis, and a separation disk member (e.g., a separation disk 11) is provided on a top end of the separation assisting circular pipe, where the separation disk member is a disk member having a diameter larger than a perimeter of the separation assisting circular pipe, in which separation assisting holes (e.g., circular pipe foam-inlet opening 14) are formed in the separation assisting circular pipe where the separation assisting holes communicate an outer perimeter surface side of the separation assisting circular pipe and an internal perimeter surface side thereof.

According to this embodiment, as explained in the aforementioned embodiments, only the air bubbles or liquid passed through the separation assisting holes and flown into the separation disk member can reach the air bubble outlet opening, and therefore it is possible to discharge the liquid having a large air bubble content from the air bubble outlet pipe to the outside.
(Embodiment D)

In (Embodiment A) or (Embodiment B), a toric member (e.g., a doughnut-shaped plate 20) is provided inside the inner rotating cylinder to pass the separation assisting circular pipe through a hole formed at a center of the toric member, in which a space (e.g., a gap 21) is formed between the hole of the toric member and the outer perimeter surface of the inner rotating cylinder.

According to this embodiment, as explained in Embodiment 2, the air bubbles can be prevented from again mixing into the foam-removed liquid, from which air bubbles have been removed, and therefore separation sharpness of the air bubbles can be improved.
(Embodiment E)

In any one of (Embodiment A) to (Embodiment D), a flow rate controlling unit (e.g., a valve 22), configured to control flow rate of a liquid discharged into the foam-removed liquid outlet pipe, is provided.

According to this embodiment, as explained in Embodiment 3, the defoaming performance can be set depending on the state of the air bubbles as contained, or the viscosity of the liquid.
(Embodiment F)

In any one of (Embodiment A) to (Embodiment E), a liquid rotation accelerating member (e.g., an accelerating plate 24), which contains radial protrusion (e.g., radial protrusion 23) provided in a position facing the liquid supply opening, and rotates together with the inner rotating cylinder, is provided.

According to this embodiment, as explained in Embodiment 4, the duration for acting the centrifugal separation on the foam-containing liquid can be prolonged, and an efficiency for separating air bubbles from the foam-containing liquid can be improved.
(Embodiment G)

In any one of (Embodiment A) to (Embodiment F), a liquid rotation accelerating member (e.g., an accelerating plate 24), which contains a spiral protrusion (e.g., spiral protrusion 26) a turn of which is in the same direction to a rotational direction of the inner rotating cylinder, in a position facing the liquid supply opening, and rotates together with the inner rotating cylinder, is provided.

According to this embodiment, as explained in Embodiment 4 using FIG. 6, an efficiency for separating air bubbles from the foam-containing liquid can be further improved compared to the structure using the liquid rotation accelerating member equipped with the radial protrusion.
(Embodiment H)

In (Embodiment G), the spiral protrusion of the liquid rotation accelerating member is multiple flight.

According to this embodiment, as explained in Embodiment 4 using FIG. 7, an efficiency for separating air bubbles from the foam-containing liquid can be even further improved compared to the structure using the liquid rotation accelerating member equipped with the radial protrusion or a structure using the liquid rotation accelerating member equipped with one spiral protrusion.
(Embodiment I)

In any one of (Embodiment A) to (Embodiment H), the foam-containing liquid supply pipe is a circular pipe member configured to supply the foam-containing liquid along the cylindrical axis, and has an orthogonal supply pipe (e.g., a horizontal inlet pipe 31) configured to supply the foam-containing liquid in the foam-containing liquid supply along a plane orthogonal to the cylindrical axis, at an opposite end thereof, relative to a direction of the cylindrical axis, to the end where the liquid supply opening is provided, in which the orthogonal supply pipe is provided to extend in a tangent direction of a circular cross-section of the foam-containing liquid supply pipe, and to form a flow of the foam-containing liquid supplied from the orthogonal supply pipe to the foam-containing liquid supply pipe in a manner that the foam-containing liquid rates in the same direction to a rotational direction of the inner rotating cylinder.

According to this embodiment, as explained in Embodiment 5, the time required for the foam-containing liquid supplied into the inner rotating cylinder to achieve the rotational speed of the inner rotating cylinder is shortened, the duration for acting the centrifugal separation on the foam-containing liquid can be prolonged, and therefore an efficiency for separating air bubbles from the foam-containing liquid can be improved.

The embodiments of the present invention are, for example, as follows:
<1> A foam removing device containing:
 a liquid container accommodating a foam-containing liquid containing air bubbles;
 a foam-containing liquid supply pipe configured to supply the foam-containing liquid to the liquid container;
 an air bubble outlet pipe configured to guide air bubbles to outside of the liquid container, where the air bubbles are concentrated to an area adjacent to a rotating axis of the liquid container by centrifugal separation acted on the foam-containing liquid by rotation of the foam-containing liquid in the liquid container, and
 a foam-removed liquid outlet pipe configured to guide a foam-removed liquid to outside of the liquid container, where the foam-removed liquid is the foam-containing liquid from which air bubbles contained are removed as the foam-containing liquid is moved in a direction far from the rotating axis of the liquid container, and the air bubbles are concentrated to the area adjacent to the rotating axis by centrifugal separation, wherein the foam removing device contains an inner rotating cylinder, which is provided in the non-rotating liquid container, is cylindrical, and is rotated with a cylindrical axis thereof as a center, wherein the foam-containing liquid supply pipe is equipped with a liquid supply opening configured to supply the foam-containing liquid to an inner side of the inner rotating cylinder, wherein the air bubble outlet pipe is equipped with an air bubble outlet provided at a position on an inner side of the inner rotating cylinder adjacent to the cylindrical axis, where the air bubble outlet is configured to receive the air bubbles, wherein the inner rotating cylinder contains a foam-removed liquid guide hole formed therein, where the foam-removed liquid guide hole is configured to guide the foam-removed liquid reached to an area adjacent to a perimeter surface of the inner rotating cylinder by the centrifugal separation into a foam-removed liquid accommodating space between an outer surface of the inner rotating cylinder and an inner surface of the liquid container, and wherein a foam-removed liquid outlet opening is provided in the foam-removed liquid accommodating space of the liquid container, where the foam-removed liquid outlet opening is configured to connect the foam-removed liquid outlet pipe with the liquid container.

<2> The foam removing device according to <1>, wherein a shaft hole is formed at one end of the liquid container relative to an axial direction of the cylindrical axis, where shaft hole is configured to inset therein a rotating shaft member for transmitting turning force to the inner rotating cylinder, and wherein a shaft bearing sealing member, which is configured to rotatably bear the rotating shaft member relative to the liquid container, and to seal between a rim of the shaft hole and the rotating shaft member, is provided.

<3> The foam removing device according to any of <1>or <2>, wherein a separation assisting circular pipe is provided inside the inner rotating cylinder to cover the air bubbles outlet pipe, where the separation assisting circular pipe rotates together with the inner rotating cylinder, and a center of a circular cross-section of the separation assisting circular pipe is aligned on the cylindrical axis, and a separation disk member is provided on a top end of the separation assisting circular pipe, where the separation disk member is a disk member having a diameter larger than a perimeter of the separation assisting circular pipe, wherein separation assisting holes are formed in the separation assisting circular pipe where the separation assisting holes communicate an outer perimeter surface side of the separation assisting circular pipe and an internal perimeter surface side thereof.

<4> The foam removing device according to <3>, wherein a toric member is provided inside the inner rotating cylinder to pass the separation assisting circular pipe through a hole formed at a center of the toric member, wherein a space is formed between the hole of the toric member and the outer perimeter surface of the inner rotating cylinder.

<5> The foam removing device according to any one of <1>to <4>, further containing a flow rate controlling unit, configured to control flow rate of a liquid discharged into the foam-removed liquid outlet pipe.

<6> The foam removing device according to any one of <1>to <5>, further containing a liquid rotation accelerating member, which contains radial protrusion provided in a position facing the liquid supply opening, and rotates together with the inner rotating cylinder.

<7> The foam removing device according to any one of <1>to <5>, further containing a liquid rotation accelerating member, which contains a spiral protrusion a turn of which is in the same direction to a rotational direction of the inner rotating cylinder, in a position facing the liquid supply opening, and rotates together with the inner rotating cylinder.

<8> The foam removing device according to <7>, wherein the spiral protrusion of the liquid rotation accelerating member is multiple flight.

<9> The foam removing device according to any one of <1>to <8>, wherein the foam-containing liquid supply pipe is a circular pipe member configured to supply the foam-containing liquid along the cylindrical axis, and has an orthogonal supply pipe configured to supply the foam-containing liquid in the foam-containing liquid supply along a plane orthogonal to the cylindrical axis, at an opposite end thereof, relative to a direction of the cylindrical axis, to the end where the liquid supply opening is provided, wherein the orthogonal supply pipe is provided to extend in a tangent direction of a circular cross-section of the foam-containing liquid supply pipe, and to form a flow of the foam-containing liquid supplied from the orthogonal supply pipe to the foam-containing liquid supply pipe in a manner that the foam-containing liquid rates in the same direction to a rotational direction of the inner rotating cylinder.

<10> A foam removing method, containing:

supplying a foam-containing liquid into a liquid container accommodating a foam-containing liquid containing air bubbles from a foam-containing liquid;

rotating a rotating member to apply turning force to the foam-containing liquid in the liquid container;

guiding air bubbles, which are concentrated to an area adjacent to a cylindrical axis of the rotating member in the liquid container by centrifugal separation, which is acted by rotating the foam-containing liquid, from an air bubbles outlet pipe to outside the liquid container; and guiding a foam-removed liquid, from which foam as contained has been removed by concentrating air bubbles to the area adjacent to the rotating axis of the rotating member in the liquid container by the centrifugal separation, from a foam-removed liquid outlet pipe to outside the liquid container, wherein the rotating the rotating member is rotating an inner rotating cylinder, which is provided in the liquid container that is not rotatable, is cylindrical, and rotates with the cylindrical axis thereof as a center, wherein the supplying a foam-containing liquid is supplying a foam-containing liquid from a liquid supply opening of the foam-containing liquid supply pipe, provided on an inner side of the inner rotating cylinder, wherein the air bubbles are received inside the air bubble outlet pipe from an air bubble outlet opening of the air bubble outlet pipe, provided to an area adjacent of the cylindrical axis at the inner side of the inner rotating cylinder, wherein the guiding foam-removed liquid contains guiding the foam-removed liquid, which reaches an area adjacent to an inner perimeter surface of the inner rotating cylinder by the centrifugal separation, from a foam-removed liquid guiding hole, which is formed in the inner rotating cylinder, to a foam-removed liquid accommodating space between an outer surface of the inner rotating cylinder and an inner surface of the liquid container, receiving the foam-removed liquid in the foam-removed liquid outlet pipe from a foam-removed liquid outlet opening provided in the foam-removed liquid accommodating space, and discharging the foam-removed liquid out of the liquid container.

This application claims priority to Japanese application No. 2012-168369, filed on Jul. 30, 2012 and incorporated herein by reference.

What is claimed is:

1. A foam removing device comprising:
a non-rotating liquid container accommodating a foam-containing liquid containing air bubbles;
a foam-containing liquid supply pipe configured to supply the foam-containing liquid to the non-rotating liquid container;
an air bubble outlet pipe attached to the foam-containing liquid supply pipe, to guide air bubbles to outside of the non-rotating liquid container, where the air bubbles are concentrated to an area adjacent to a rotating axis of the non-rotating liquid container by centrifugal separation acted on the foam-containing liquid by rotation of the foam-containing liquid in the non-rotating liquid container, and
a foam-removed liquid outlet pipe configured to guide a foam-removed liquid to outside of the non-rotating liquid container, where the foam-removed liquid is the foam-containing liquid from which air bubbles contained are removed as the foam-containing liquid is moved in a direction away from the rotating axis of the non-rotating liquid container, and the air bubbles are concentrated to the area adjacent to the rotating axis by centrifugal separation,
wherein the foam removing device contains a cylindrical inner rotating cylinder, which is provided in the non-rotating liquid container, and is rotated with a cylindrical axis thereof as a center,
wherein the foam-containing liquid supply pipe is configured to supply the foam-containing liquid to an inner side of the inner rotating cylinder,
wherein the air bubble outlet pipe is equipped with an air bubble outlet provided at a position on an inner side of the inner rotating cylinder adjacent to the cylindrical axis, where the air bubble outlet is configured to receive the air bubbles,
wherein the inner rotating cylinder contains a foam-removed liquid guide hole formed therein, where the foam-removed liquid guide hole is configured to guide the foam-removed liquid reached to an area adjacent to a perimeter surface of the inner rotating cylinder by the centrifugal separation into a foam-removed liquid accommodating space between an outer surface of the inner rotating cylinder and an inner surface of the non-rotating liquid container,
wherein a foam-removed liquid outlet opening is provided in the foam-removed liquid accommodating space of the non-rotating liquid container, where the foam-removed liquid outlet opening is configured to connect the foam-removed liquid outlet pipe with the non-rotating liquid container,
wherein a separation assisting circular pipe is provided inside the inner rotating cylinder to cover the air bubbles outlet pipe, where the separation assisting circular pipe rotates together with the inner rotating cylinder, and a center of a circular cross-section of the separation assisting circular pipe is aligned on the cylindrical axis, and a separation disk member is provided on a top end of the separation assisting circular pipe, where the separation disk member is a disk member having a diameter larger than a perimeter of the separation assisting circular pipe,
wherein separation assisting holes are formed in the separation assisting circular pipe where the separation assisting holes communicate an outer perimeter surface side of the separation assisting circular pipe and an internal perimeter surface side thereof.

2. The foam removing device according to claim 1, wherein a toric member is provided inside the inner rotating cylinder to pass the separation assisting circular pipe through a hole formed at a center of the toric member, wherein a space is formed between the hole of the toric member and the outer perimeter surface of the inner rotating cylinder.

3. The foam removing device according to claim 1, further comprising a flow rate controlling unit, configured to control a flow rate of a liquid discharged into the foam-removed liquid outlet pipe.

4. The foam removing device according to claim 1, further comprising a liquid rotation accelerating member, which contains radial protrusion provided in a position facing the liquid supply opening, and rotates together with the inner rotating cylinder.

5. The foam removing device according to claim 1, further comprising a liquid rotation accelerating member, which contains a spiral protrusion a turn of which is in the same direction to a rotational direction of the inner rotating cylinder, in a position facing the liquid supply opening, and rotates together with the inner rotating cylinder.

6. The foam removing device according to claim 5, wherein the spiral protrusion of the liquid rotation accelerating member is a multiple flight spiral protrusion.

7. The foam removing device according to claim 1, wherein the foam-containing liquid supply pipe is a circular pipe member configured to supply the foam-containing liquid along the cylindrical axis, and has an orthogonal supply pipe configured to supply the foam-containing liquid along a plane orthogonal to the cylindrical axis, at an opposite end thereof, relative to a direction of the cylindrical axis, to the end where the liquid supply opening is provided,
wherein the orthogonal supply pipe is provided to extend in a tangent direction of a circular cross-section of the foam-containing liquid supply pipe, and to form a flow of the foam-containing liquid supplied from the orthogonal supply pipe to the foam-containing liquid supply pipe in a manner that the foam-containing liquid rates in the same direction to a rotational direction of the inner rotating cylinder.

8. The foam removing device according to claim 1, wherein the air bubble outlet pipe is aligned at a center of a cross-section of the foam-containing liquid supply pipe, and the air bubble outlet pipe extends out from a bottom surface of the foam-containing liquid supply pipe.

9. A foam removing method, comprising:
(a) supplying a foam-containing liquid into a non-rotating liquid container provided to accommodate the foam-containing liquid, the foam-containing liquid accommodated in the non-rotating liquid container containing air bubbles;
(b) rotating a rotating member to apply turning force to the foam-containing liquid in the non-rotating liquid container;
(c) guiding air bubbles, which are concentrated to an area adjacent to a cylindrical axis of the rotating member in the non-rotating liquid container by centrifugal separation, which is acted by rotating the foam-containing liquid, from an air bubbles outlet pipe to outside the non-rotating liquid container; and (d) guiding a foam-removed liquid, from which foam as contained has been removed by concentrating air bubbles to the area adjacent to the rotating axis of the rotating member in the non-rotating liquid container by the centrifugal separation, from a foam-removed liquid outlet pipe to outside the non-rotating liquid container, wherein the rotating member rotated in (b) is an inner rotating cylinder, which is provided in the non-rotating liquid container, is cylindrical, and rotates with the cylindrical axis thereof as a center, wherein the foam-containing liquid is supplied in (a) from a liquid supply opening of the foam-containing liquid supply pipe, provided on an inner side of the inner rotating cylinder, wherein the air bubbles are received inside the air bubble outlet pipe from an air bubble outlet opening of the air bubble outlet pipe, provided to an area adjacent of the cylindrical axis at the inner side of the inner rotating cylinder, wherein the guiding foam-removed liquid contains guiding the foam-removed liquid, which reaches an area adjacent to an inner perimeter surface of the inner rotating cylinder by the centrifugal separation, from a foam-removed liquid guiding hole, which is formed in the inner rotating cylinder, to a foam-removed liquid accommodating space between an outer surface of the inner rotating cylinder and an inner surface of the liquid container, receiving the foam-removed liquid in the foam-removed liquid outlet pipe from a foam-removed liquid outlet opening provided in the foam-removed liquid accommodating space, and discharging the foam-removed liquid out of the liquid container, wherein a separation assisting circular pipe is provided inside the inner rotating cylinder to cover the air bubbles outlet pipe and rotates together with the inner rotating cylinder, and a center of a circular cross-section of the separation assisting circular pipe is aligned on the cylindrical axis, and a separation disk member is provided on a top end of the separation assisting circular pipe and is a disk member having a diameter larger than a perimeter of the separation assisting circular pipe, and wherein separation assisting holes are formed in the separation assisting circular pipe and communicate an outer perimeter surface side of the separation assisting circular pipe and an internal perimeter surface side thereof.

10. The foam removing method according to claim 9, further comprising:

controlling a flow rate of a liquid discharged into the foam-removed liquid outlet pipe.

11. The foam removing method according to claim 9, further comprising:

rotating a liquid rotation accelerating member, including radial protrusion disposed in a position facing the liquid supply opening, together with the inner rotating cylinder.

12. The foam removing method according to claim 9, further comprising:

rotating a liquid rotation accelerating member together with the inner rotating cylinder, the liquid rotation accelerating member including a spiral protrusion disposed in a position facing the liquid supply opening, a turn of the spiral protrusion being in the same direction as a rotational direction of the inner rotating cylinder.

13. The foam removing method according to claim 12, wherein the spiral protrusion of the liquid rotation accelerating member is a multiple flight spiral protrusion.

14. The foam removing method according to claim 9, wherein the foam-containing liquid supply pipe is a circular pipe member configured to supply the foam-containing liquid along the cylindrical axis, and has an orthogonal supply pipe configured to supply the foam-containing liquid along a plane orthogonal to the cylindrical axis, at an opposite end thereof, relative to a direction of the cylindrical axis, to the end where the liquid supply opening is provided, and wherein the orthogonal supply pipe is provided to extend in a tangent direction of a circular cross-section of the foam-containing liquid supply pipe, and to form a flow of the foam-containing liquid supplied from the orthogonal supply pipe to the foam-containing liquid supply pipe in a manner that the foam-containing liquid rates in the same direction to a rotational direction of the inner rotating cylinder.

* * * * *